(12) United States Patent
Matsumoto et al.

(10) Patent No.: US 6,267,092 B1
(45) Date of Patent: Jul. 31, 2001

(54) SUCTION APPARATUS OF MULTI-CYLINDER INTERNAL COMBUSTION ENGINE

(75) Inventors: Yukihiro Matsumoto; Toshiya Watahiki; Toshiharu Aoshima; Tadanobu Ohmori; Kyoko Yamaguchi; Tsutomu Tsukii, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/434,171

(22) Filed: Nov. 4, 1999

(30) Foreign Application Priority Data

Nov. 6, 1998 (JP) .................................................. 10-315505
Nov. 11, 1998 (JP) ................................................. 10-320713

(51) Int. Cl.⁷ .................................................. F02M 35/12
(52) U.S. Cl. ................................ 123/184.57; 123/184.61
(58) Field of Search ........................ 123/184.21, 184.42, 123/184.47, 184.53, 184.57, 184.61; 181/240

(56) References Cited

U.S. PATENT DOCUMENTS

| 5,662,077 | * | 9/1997 | Boswell | 123/184.21 |
| 5,664,533 | * | 9/1997 | Nakayama et al. | 123/184.42 |
| 5,826,553 | * | 10/1998 | Nakayama et al. | 123/184.42 |
| 5,924,399 | * | 7/1999 | Koike et al. | 123/184.21 |
| 5,996,543 | * | 12/1999 | Nakayama et al. | 123/184.21 |
| 6,024,188 | * | 2/2000 | Yamaguchi et al. | 181/204 |
| 6,155,224 | * | 12/2000 | Akihisa et al. | 123/184.57 |

FOREIGN PATENT DOCUMENTS

| 0569714 | * | 11/1993 | (EP) | F02B/27/02 |
| 7-91263 | | 4/1995 | (JP) . | |

* cited by examiner

Primary Examiner—Noah P. Kamen
Assistant Examiner—Hai Huynh
(74) Attorney, Agent, or Firm—Armstrong, Westerman, Hattori, McLeland & Naughton, LLP.

(57) ABSTRACT

A suction apparatus of a multi-cylinder internal combustion engine has a suction manifold disposed in a direction parallel with a row of cylinders at one side of a cylinder head. The suction apparatus includes a plurality of independent suction passages of equal length each extending from an engine main body at right angle, a suction gathering chamber connected to the suction passages and disposed in the direction parallel with the row of cylinders, a throttle body provided at an upper stream end of the suction gathering chamber, and a resonance vessel communicating with the suction gathering chamber. The resonance vessel is supported by a cylinder head cover and a wall of the gathering chamber elastically through rubber members covering above of the independent suction passages with a space, and communicates with an upper part of the suction gathering chamber at a just downstream position of the throttle body. The space has a volume capable of receiving at least fuel injection valves and fuel supply pipes for respective cylinders of the internal combustion engine.

10 Claims, 15 Drawing Sheets

F I G. 10
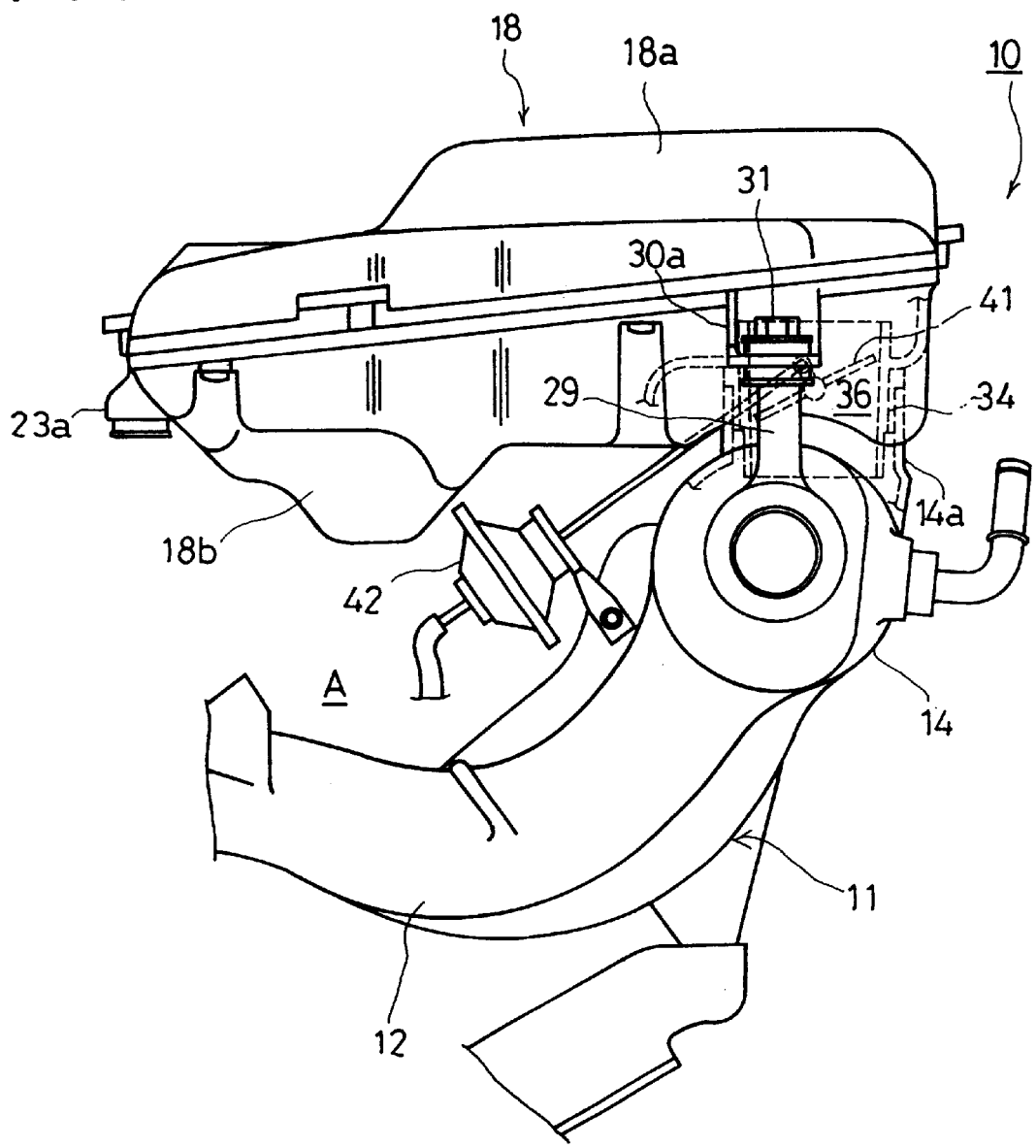

F I G. 13
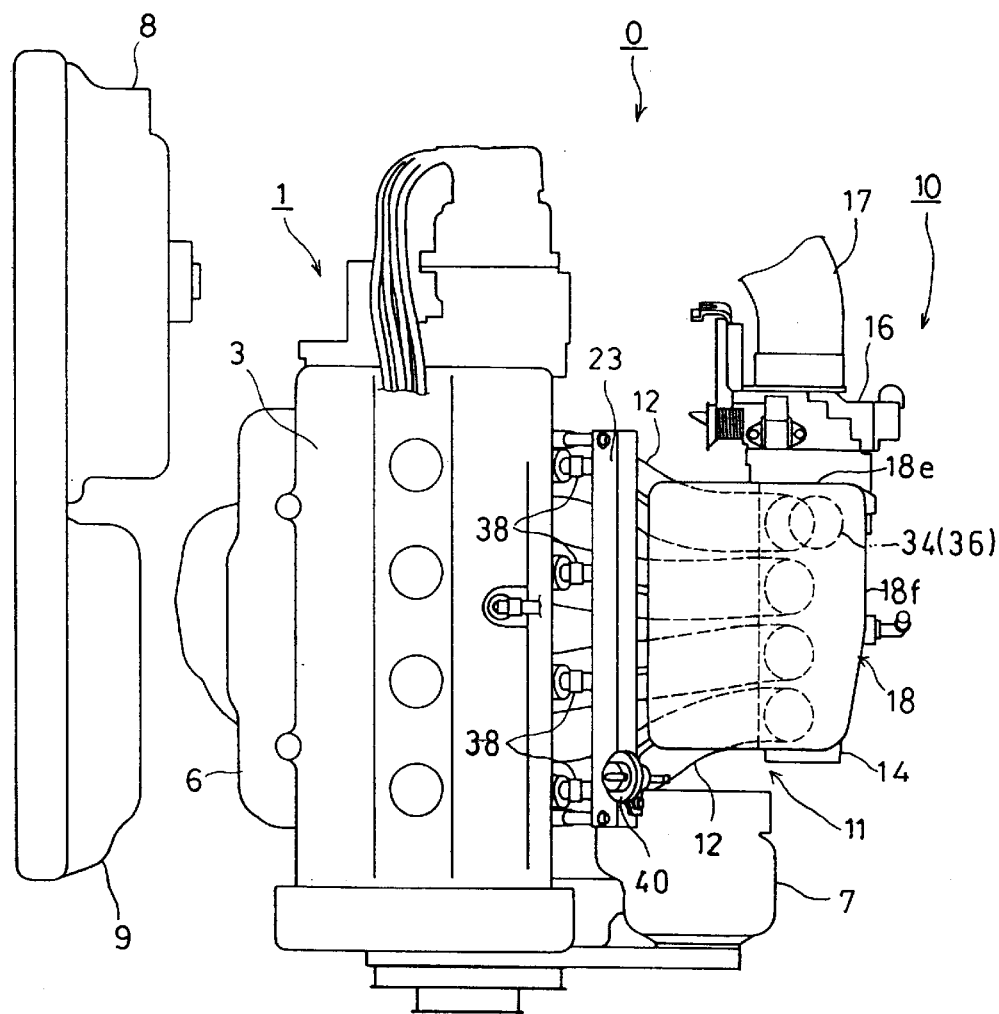

SUCTION APPARATUS OF MULTI-CYLINDER INTERNAL COMBUSTION ENGINE

BACKGROUND OF THE INVENTION

1. Field of the Invention

The present invention relates to a suction apparatus of a multi-cylinder internal combustion engine, particularly to such a suction apparatus having a plurality of independent suction passages of equal length.

2. Description of the Related Art

In a multi-cylinder internal combustion engine for a vehicle, it has been practiced generally to change passage length or volume of a suction pipe in accordance with rotative speed of the internal combustion engine for utilizing inertia supercharging effect and resonance (pulsation) supercharging effect of suction air in order to maintain high volumetric efficiency over a wide rotative speed region from a low rotative speed region to a high rotative speed region.

Japanese Laid-Open Patent Publication No. 7-91263 discloses such a multi-cylinder internal combustion engine which has a resonance vessel attached to a suction passage to improve resonance supercharging effect of suction air particularly in a low speed region.

This engine is longitudinally mounted on a vehicle, namely mounted on a vehicle with a crankshaft directed lengthwise of the vehicle, and has a suction apparatus comprising a plurality of independent suction passages of equal length. Each of the independent suction passages has a downstream end communicating with a corresponding cylinder and an upper stream end communicating with a suction gathering chamber.

Each independent suction passage has an upper stream portion arranged along a row of cylinders (in lengthwise direction of the vehicle) at one side of the engine with respect to the row of cylinders, a downstream portion extending toward the engine and a curved portion formed between the upper stream portion and the downstream portion so as to change direction of the passage.

The curved portions of the respective suction passages are disposed so that a line connecting centers of the curved portions is inclined with respect to the row of cylinders so as to be distant from the eigne at a side of the gathering chamber. And on outside of the curved portions is disposed a resonance vessel communicating with the gathering chamber along the above-mentioned center connecting line.

A suction pipe forming the independent suction passage is divided into two pipe sections at the curved portion and both the pipe sections are connected with each other by means of a flange. The resonance vessel is fixed to the flange.

Japanese Laid-Open Patent Publication No. 2-199266 discloses a suction apparatus of a multi-cylinder internal combustion engine laterally mounted on a vehicle which comprises a surge tank (gathering section of a plurality of independent suction passages), a plurality of curved independent suction passages extending from the surge tank to communicate with respective cylinders, a resonance chamber provided inside of curved sections of the suction passages between the surge tank and the suction passages, and a communication passage connecting the surge tank and the resonance chamber.

The above communication passage is formed snaking along a side surface of the independent suction passages and an end of the communication passage facing toward the surge tank is provided with a communication opening which is formed in the neighborhood of an end surface of the surge tank opposite to another end surface provided with a throttle body.

The suction apparatus is divided into an upper half body and a lower half body by a common partition surface halving the independent suction passages, the resonance chamber and the communication passage respectively.

In the suction apparatus of the japanese Publication No. 7-91263, since the resonance vessel is arranged on one side of the suction manifold along the independent suction passages, the resonance vessel protrudes in a direction perpendicular to the row of cylinders to obstruct miniaturization of the suction apparatus, and a connecting member such as a tube is necessary for connecting the resonance vessel to the gathering section of the independent suction passages so that the number of parts is increased and assembling works are necessary.

Since the connecting pipe for connecting the resonance vessel to the gathering section of the independent suction passages is long, though suction characteristic in a low rotative speed region can be improved, improvement of suction characteristic in middle and high rotative speed region by utilizing resonance supercharging effect is difficult because enlargement of diameter of the connecting pipe is limited. If the diameter of the connecting pipe is merely enlarged to a possible extent, the resonance chamber itself may serve as a volume of the gathering section of the independent suction passage. In this case, the resonance supercharging effect by utilizing the resonance chamber can not be expected.

Further, since the resonance vessel is fixedly connected to the flanges of the independent suction passages, vibration of the engine main body is directly transmitted to the resonance vessel and the resonance vessel generates secondary radiating sound so that deterioration of acoustic commercial quality of the engine is feared and stabilization of suction characteristic in resonance supercharging utilizing the resonance chamber is liable to be injured.

With respect to the suction manifold itself, since a mass vibrating with the same phase is increased, the vibration is accelerated and durability of suction control parts such as a throttle body connected to the suction manifold is liable to be deteriorated.

The gathering section of the independent suction passages is disposed at a position where undergoes heat from a front part of the engine room after passing through a radiator and heat from an upper part of the engine room, therefore, it is feared that lowering of engine out put and deterioration of engine starting nature are caused.

On the one hand, the suction apparatus of the latter Japanese publication No. 2-199266 has problems as follows.

An communication opening of the communication passage facing the surge tank is formed on a bottom surface of the surge tank at a position near an end surface opposite to an end surface with the throttle body fitted, therefore, suction air pressure wave turned at the suction gathering section including the resonance chamber and the surge tank advances against suction air entering passing through the throttle body undergoing an influence of the suction air, as the result, the suction air pressure wave is damped in the surge tank and the independent suction passages, so that resonance supercharging effect of the suction air can not be exhibited enough.

Also in this suction apparatus, more than half of the independent suction passages and the surge tank which is a gathering section of the independent suction passages is positioned at a place where undergoes heat from a front part of the engine room after passing through a radiator and heat from an upper part of the engine room, therefore, it is feared still that lowering of engine out put and deterioration of engine starting nature are caused.

The present invention is accomplished in order to overcome the above difficulties, and an object of the invention is to provide a suction apparatus of a multi-cylinder internal combustion engine having a plurality of independent suction passages and a resonance vessel in which the suction apparatus can be made compact, vibration of attachment construction of the resonance vessel can be prevented, suction characteristic (volumetric efficiency or charging efficiency) particularly in middle and high rotative speed region can be improved, and lowering of engine out put can be prevented by sheltering suction system from heat in the engine room.

SUMMARY OF THE INVENTION

In order to achieve the above object, the present invention provides a suction apparatus of a multi-cylinder internal combustion engine having a suction manifold disposed in a direction parallel with a row of cylinders at one side of a cylinder head which includes a plurality of independent suction passages of equal length each extending from an engine main body at right angle, a suction gathering chamber connected to the suction passages and disposed in the direction parallel with the row of cylinders, a throttle body provided at an upper stream end of the suction gathering chamber, and a resonance vessel communicating with the suction gathering chamber, wherein the resonance vessel is supported by a cylinder head cover and a wall of the suction gathering chamber elastically through rubber members covering above of the independent suction passages with a space, and communicates with an upper part of the suction gathering chamber at a just downstream position of the throttle body, the space having a volume capable of receiving at least fuel injection valves and fuel supply pipes for respective cylinders of the internal combustion engine.

In this suction apparatus, the resonance vessel extends over the cylinder head cover and the suction chamber, and covers above of the independent suction passages with a space which has a volume capable of receiving at least fuel injection valves and fuel supply pipes for respective cylinders of the internal combustion engine.

Therefore, the resonance vessel does not protrude in a direction perpendicular to the row of cylinders and the space between the resonance vessel and the independent suction passages is utilized effectively, so that the suction apparatus can be constructed compactly.

Since the resonance vessel isolates heat in an upper part of the engine room from the fuel injection valves, the fuel supply pipes and the suction manifold including the independent suction passages, lowering of engine out put and deterioration of engine starting nature can be prevented. Moreover, since the resonance vessel hides the fuel injection valves, the fuel supply pipes and the like, appearance of the internal combustion engine is improved.

The resonance vessel is supported by the cylinder head cover and the wall of the suction gathering chamber elastically through the rubber members. As a result, vibration generated by operation of the engine and transmitted to the resonance vessel is intercepted or damped at the supporting section not to influence natural frequency of the resonance vessel, therefore, suction characteristic in resonance supercharging utilizing the resonance vessel can be stabilized. And radiating sound from the resonance vessel can be reduced.

By elastic support of the resonance vessel on the cylinder head cover and the suction gathering chamber wall through the rubber members, a phase difference is caused between both vibrations of the resonance vessel and the suction manifold, thereby both the vibrations can be suppressed by interference of the vibrations (dynamic damp effect). Therefore, durability of suction control parts such as the throttle body connected to the suction manifold or the like can be improved.

The resonance vessel communicates with an upper part of the suction gathering chamber at a position just downstream of the throttle body which is fitted to an upper stream end of the suction gathering chamber.

Therefore, suction air pressure wave turned at the suction gathering section including a resonance chamber of the resonance vessel does not oppose a suction air entering through the throttle body and does not be influenced by the suction air. Accordingly, damping of the suction air pressure wave in the suction gathering chamber and the independent suction passages is suppressed to the minimum and the pressure wave can influence another cylinder smoothly. Particularly, resonance supercharging effect of suction air in middle and high rotative speed regions is improved to improve volumetric efficiency of suction air.

Size of an opening of the resonance vessel for communicating with the suction gathering chamber can be set suitably in accordance with rotative speed of the engine to obtain the maximum supercharging effect, so that supercharging effect of suction air particularly in middle and high rotative speed regions of the engine can be improved. And also from this aspect, volumetric efficiency of suction air can be improved.

According to another aspect of the invention, there is provided a suction apparatus of a multi-cylinder internal combustion engine laterally mounted on a front part of a vehicle having a suction manifold disposed in rear of a main body of the internal combustion engine which includes a plurality of independent suction passages of equal length each extending from the engine main body at right angles and bent upward, a suction gathering chamber connected to the suction passages and disposed in a direction parallel with a row of cylinders, a throttle body provided at an upper stream end of the suction gathering chamber, and a resonance chamber communicating with the suction gathering chamber, wherein the resonance chamber is formed integrally with the suction manifold covering at least a part of the independent suction passages and the suction gathering chamber from above, and communicates with an upper part of the suction gathering chamber at a just downstream portion of the throttle body through a connecting passage, the suction manifold and the resonance chamber are formed by combining a lower half body formed by the independent suction passages, a lower half of the suction gathering chamber and a lower half of the resonance chamber as one body, and an upper half body formed by an upper half of the suction gathering chamber and an upper half of the resonance chamber as one body, and the connecting passage is formed integrally with the upper half body.

In this suction apparatus, the resonance chamber is formed integrally with the suction manifold covering at least a part of the respective independent suction passages and the suction gathering chamber from above and the suction gathering chamber is disposed along the row of cylinders of the engine.

Therefore, the resonance chamber does not protrude in a direction perpendicular to the row of cylinders of the engine.

Moreover, since the resonance chamber covers at least a part (upper stream side) of the respect independent suction passages, the space between the engine main body and the suction gathering chamber can be utilized to constitute the resonance chamber or the whole suction apparatus including the resonance chamber compactly.

Thus the resonance chamber can be constituted compactly, however, by selecting the length of the resonance chamber extending over at least a part of the independent suction passages and the suction gathering chamber suitably, the resonance chamber of required volume can be formed integrally with the suction manifold.

Since at least a part of the independent suction passages and the suction gathering chamber are hidden from a heat in a front part of the engine room after passing through a radiator and a heat in an upper part of the engine room by the resonance chamber, temperature rise of suction air flowing in the independent suction passages and the suction gathering chamber is suppressed so that lowering of volumetric efficiency and engine out put, and deterioration of engine starting nature can be prevented.

The resonance chamber communicates with an upper part of the suction gathering chamber at a position just downstream of the throttle body through the connecting passage, and the throttle body is fitted to an upper stream end of the suction chamber.

Therefore, suction air pressure wave turned at the suction gathering section including the resonance chamber and the suction gathering chamber does not oppose to a suction air entering through the throttle body to be not directly influenced by the suction air. Accordingly, damping of the suction air pressure wave in the suction gathering chamber and the independent suction passages is suppressed to the minimum so as to influence another cylinder smoothly, resonance supercharging effect of suction air particularly in middle and high rotative speed region of the engine is improved, and volumetric efficiency can be improved.

The suction manifold and the resonance chamber are formed by combining a lower half body formed by the independent suction passages, a lower half of the suction gathering chamber and a lower half of the resonance chamber as one body, and an upper half body formed by an upper half of the suction gathering chamber and an upper half of the resonance chamber as one body, and the connecting passage is formed integrally with the upper half body.

Since the suction manifold and the resonance chamber are formed concurrently by combining the lower half body and the upper half body which are obtained by monoblock casting, their manufacturing and construction are simplified to reduce cost.

Since the suction manifold, the resonance chamber and the connecting passage are formed in the manner as described above, rigidity of the suction manifold and the resonance chamber can be improved, vibration of the suction manifold is reduced and durability of parts for suction control can be ensured over a long time.

Size of the connecting passage (length of projection into the resonance chamber and diameter) and volume of the resonance chamber can be set suitably in accordance with rotative speed of the engine to obtain the maximum resonance supercharging effect, so that resonance supercharging effect of suction air particularly in middle and high rotative speed regions of the engine can be improved. And also from this aspect, volumetric efficiency of suction air can be improved.

BRIEF DESCRIPTION OF THE DRAWINGS

FIG. 10 is a side view of a suction apparatus according to another embodiment of the present invention;

FIG. 13 is a plan view of the internal combustion engine of FIG. 12;

DETAILED DESCRIPTION OF PREFERRED THE EMBODIMENT

Hereinafter, a preferred embodiment of the present invention will be described with reference to FIGS. 1 to 9.

Figure 1:
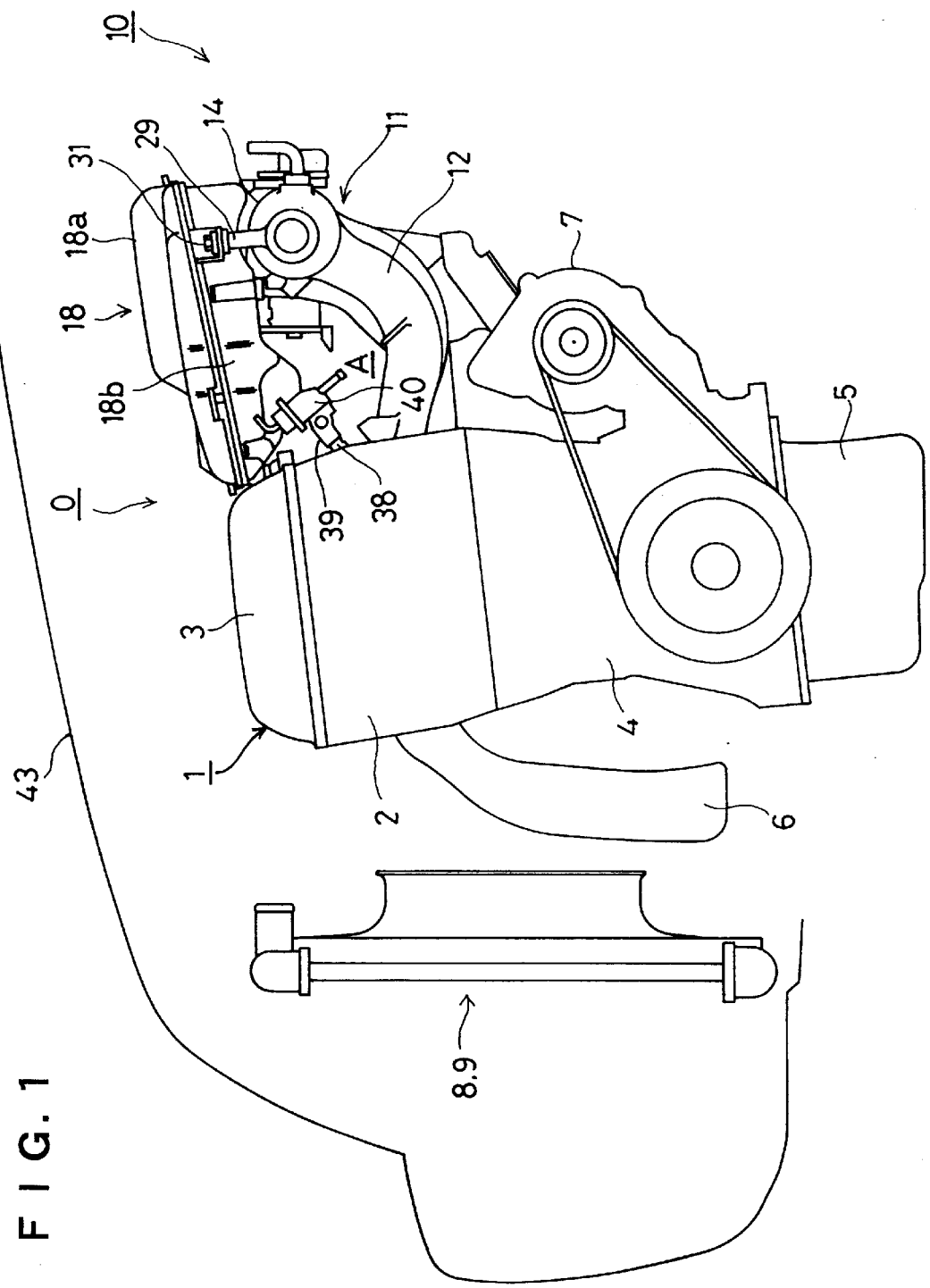
FIG. 1 is a rough side view of a multi-cylinder internal combustion engine mounted on a vehicle having a suction apparatus according to an embodiment of the present invention.
Figure 2:
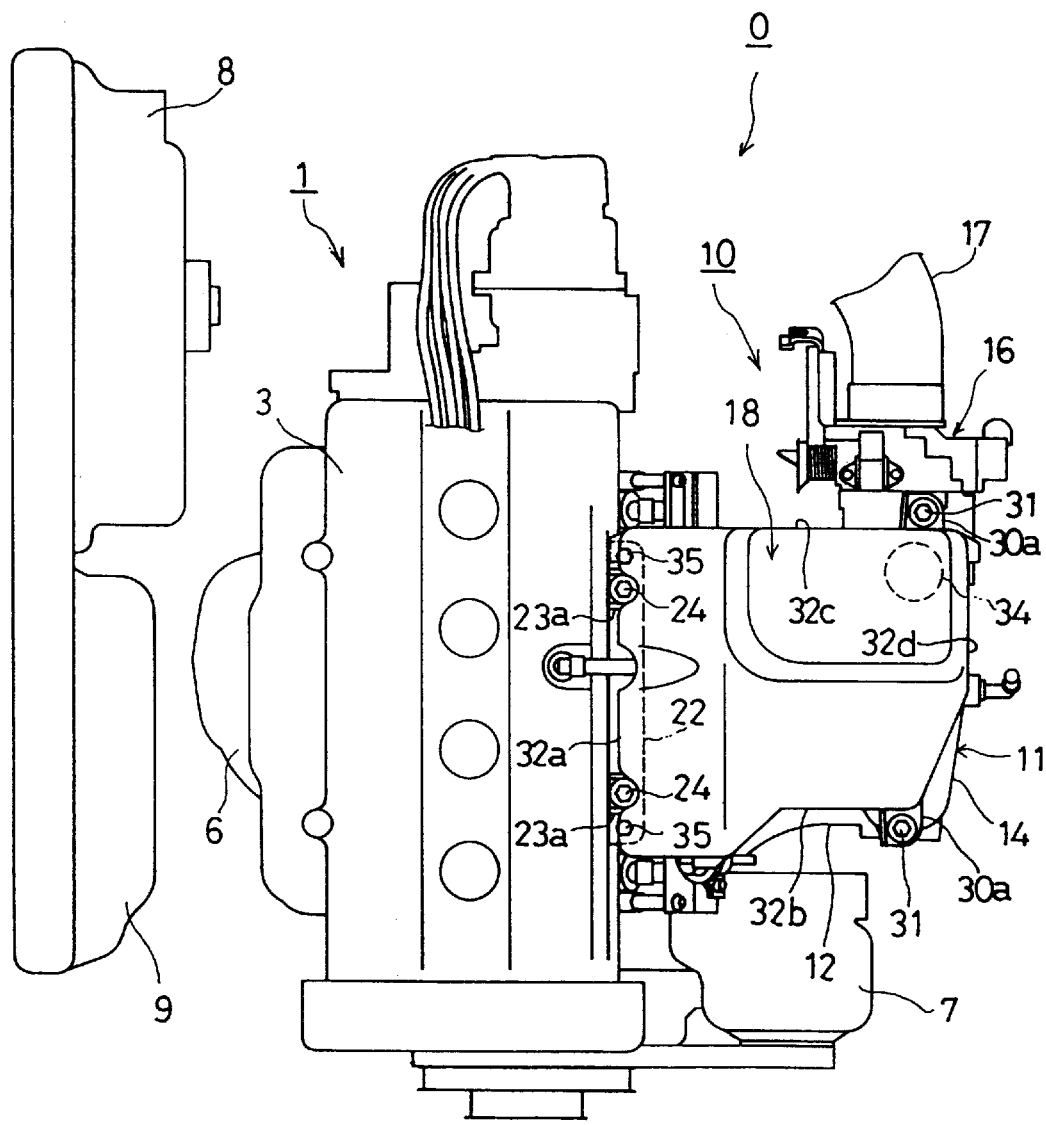
FIG. 2 is a rough plan view of the internal combustion engine.

The multi-cylinder internal combustion engine 0 having a suction apparatus 10 according to the preferred embodiment of the invention shown in FIGS. 1 and 2 is a straight-type four cylinder internal combustion engine and mounted on a front part of a vehicle laterally, namely, having a crankshaft directed breadthwise of the vehicle. The engine 0 comprises an engine main body 1 having a cylinder block 4, cylinder head 2, cylinder head cover 3 and an oil pan 5 provided under the cylinder block 4, a suction apparatus 10 disposed in rear of the engine main body 1, and an exhaust manifold 6 disposed in front of the engine main body 1 along a row of cylinders over the cylinder head 2 and the cylinder block 4. In front of the exhaust manifold 6 are provided a radiator 8 and a condenser 9.

The suction apparatus 10 includes a suction manifold 11 disposed in rear of the cylinder head 2 along the row of cylinders and a resonance vessel 18 to be described later. 7 denotes an alternator driven by a crankshaft (not shown) through a belt transmission mechanism, and 43 denotes a bonnet.

Figure 8:
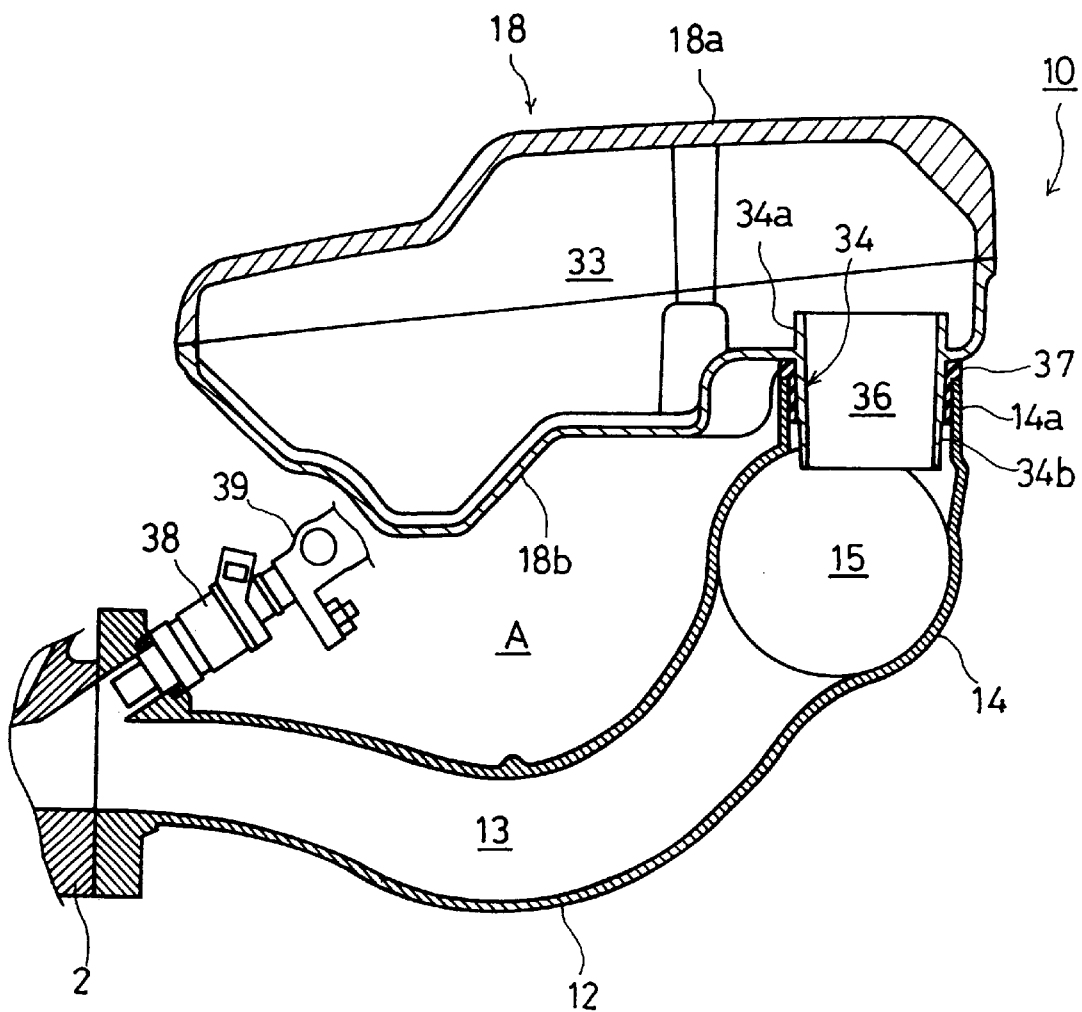
FIG. 8 is a rough sectional view showing another structure for attaching the resonance vessel to the suction gathering pipe.
Figure 9:
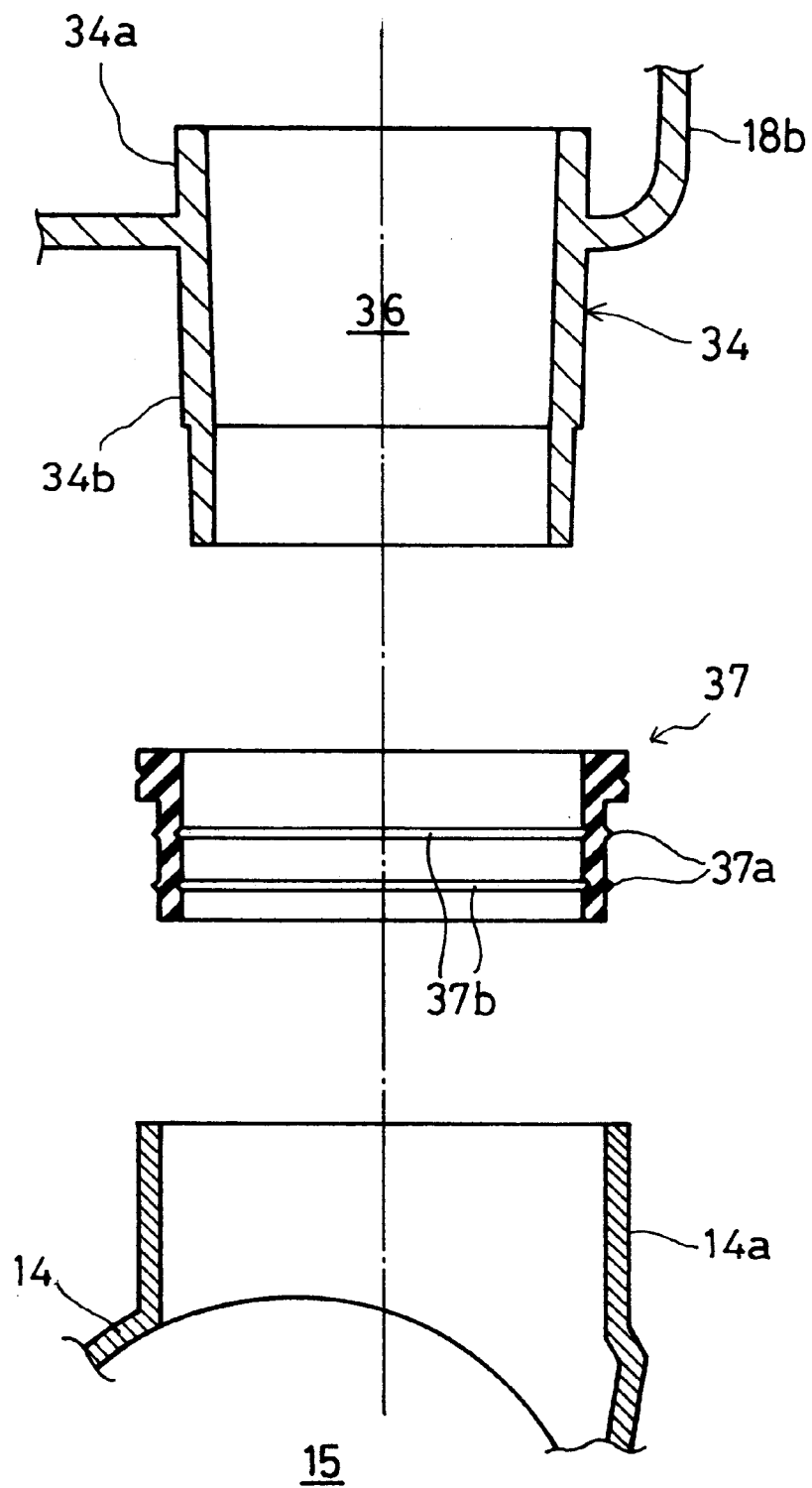
FIG. 9 is an enlarged exploded view of the attachment structure of FIG. 8.

The suction manifold 11 is made of metal and includes four independent suction pipes 12, 12 . . . forming four independent suction passages 13, 13 . . . (FIG. 8) of equal length corresponding to four cylinders respectively. Each of the independent suction pipes 12, 12 . . . extends from a rear side of the cylinder head 2 in a direction perpendicular thereto inclining downward then somewhat upward to be connected to a suction gathering pipe 14 forming a suction gathering chamber 15 (FIG. 8).

The suction gathering pipe 14 is made of an about cylindrical pipe having an axis directed in parallel with the row of cylinders of the engine main body 1. A throttle body 16 is fitted to an upstream end of the suction gathering pipe 14, and an upstream side of the throttle body 16 is connected to an air cleaner (not shown) through a common suction pipe 17.

Suction air passing through the throttle body 16 is once gathered in the suction gathering chamber 15, then diverges into the four independent suction passages 13, 13 . . . to be supplied to respective cylinders.

The resonance vessel 18 is attached to the suction gathering pipe 14 so as to communicate with the suction gathering chamber 15 in the pipe 14.

The resonance vessel 18 is made of metal or resin and shaped in a flat vessel having a substantially rectangular plan. The resonance vessel 18 is disposed above the independent suction pipes 12,12 . . . which form the independent suction passages 13, 13 . . . , and extends over the cylinder head cover 3 and the suction gathering pipe 14 which forms the suction gathering chamber 15, so as to cover the independent suction pipes 12, 12 . . . with a space A.

The resonance vessel 18 is elastically supported by the cylinder head cover 3 and the suction gathering pipe (suction gathering chamber wall) 14 through rubber members.

Figure 4:
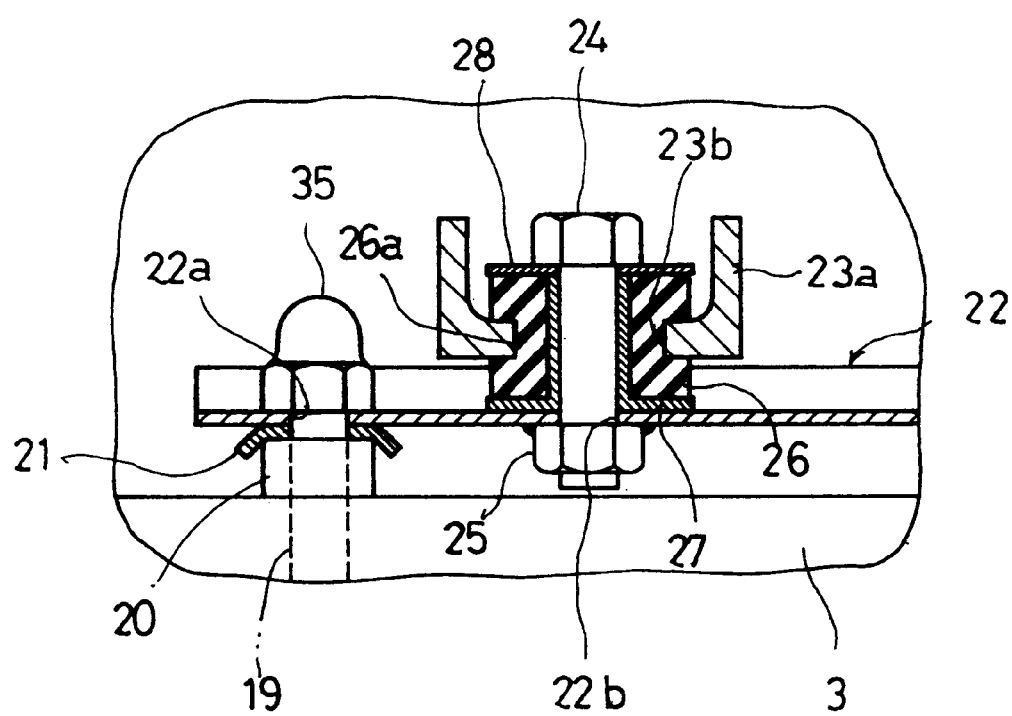
FIG. 4 is a view showing a structure for attaching the resonance vessel to an engine main body partly in section.
Figure 5:
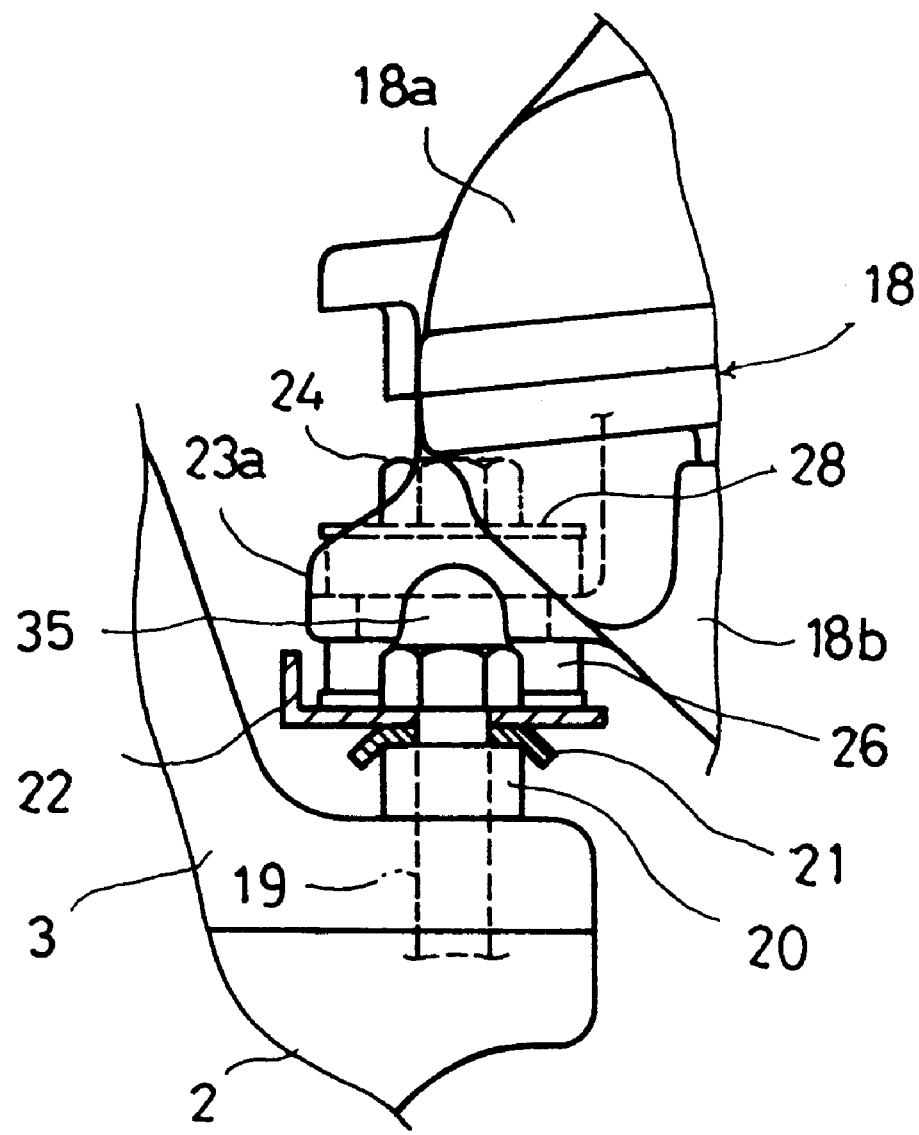
FIG. 5 is a left side view of FIG. 4.
Figure 6:
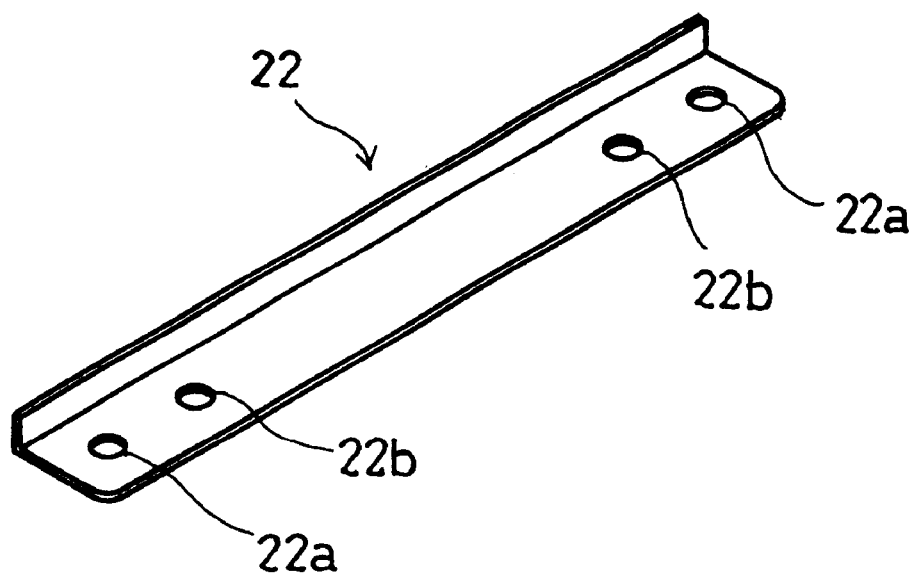
FIG. 6 is a perspective view of a bracket used for attaching the resonance vessel to the engine main body.

As shown in FIGS. 4, 5, end portions of two through bolts 19, 19 connecting the cylinder head 2 with the cylinder head cover 3 (one of the bolts 19 is not shown) projects upward penetrating attachment pedestals 20, 20 of the cylinder head cover 3 (one of the pedestals 20 is not shown).

The projecting end of the through bolt 19 is inserted in a hole of a washer 21 and an outer bolt hole 22a of a bracket 22 (FIG. 6) and a nut 35 is screwed onto the end of the bolt 19 to tightly fix the bracket 22 to the attachment pedestal 20.

Thus the bracket 22 is fixed to both the attachment pedestals 20, 20 of the cylinder head cover 3 at positions of a pair of outer bolt holes 22a, 22a of the bracket 22.

The bracket 22 has a pair of inner bolt holes 22b, 22b in addition to the outer bolt holes 22a, 22a. Two places on a side 32a of the rectangular resonance vessel 18 are bolted to the bracket 22 through rubber member 26 for elastically supporting the resonance vessel 18.

Figure 3:
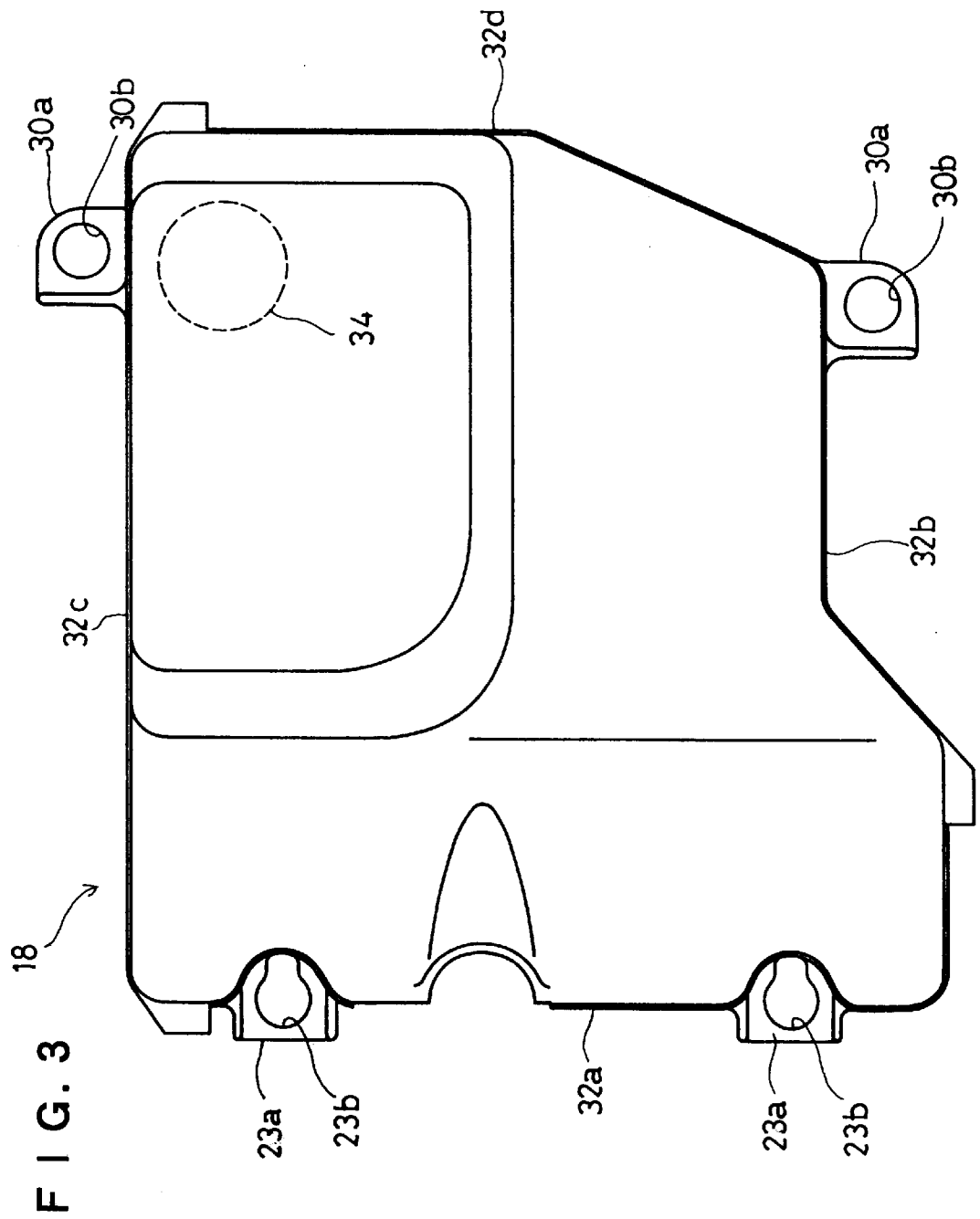
FIG. 3 is a plan view of a resonance vessel of the suction apparatus.

As shown in FIG. 3, at each of the above-mentioned two places on the side 32a of the resonance vessel 18 is projected a first attachment arm 23a having a bolt hole 23a. As shown in FIG. 4, the bolt hole 23a is aligned with the above-mentioned inner bolt hole 22b of the bracket 22, a rubber member 26 is inserted between both the bolt holes 23b, 22b, the rubber member 26 and the bracket 22 are tightened by a bolt 24 and a nut 25, thus the aforementioned two places on the side 32a of the resonance vessel 28 is attached to the cylinder head cover 3 elastically.

The rubber member 26 is formed in a column having an axial hole, and when it is tightened by the bolt 24 and the nut 35, its both end surfaces and an inner peripheral surface of the axial hole are held by a frame body consisting of a cylindrical member 27 with a flange and a circular plate 28 of the same size as the flange to contract the rubber member 26.

A peripheral wall portion of the bolt hole 23b of the resonance vessel 18 engages with an annular groove 26a cut into an outer periphery of the rubber member 26 so that the rubber member 26 is fixed to the wall portion of the bolt hole 23b. The bolt 24 passes through a center bolt hole of the circular plate 28, the cylindrical portion of the cylindrical member with flange 27 and further the inner bolt hole 22b of the bracket 22. A nut 25 is screwed to a projected end of the bolt 24.

Thus the side 32a of the resonance vessel 18 is elastically supported on the cylinder head cover 3 through the rubber member 26 and the bracket 22, therefore, when a vibration generated by operation of the engine 0 is transmitted to the resonance vessel 18 through the cylinder head 2, the cylinder head cover 3, the bracket 22 and the rubber member 26, the rubber member 26 deforms elastically to absorb the vibration, so that transmission of the vibration to the resonance vessel 18 is intercepted or damped.

Figure 7:
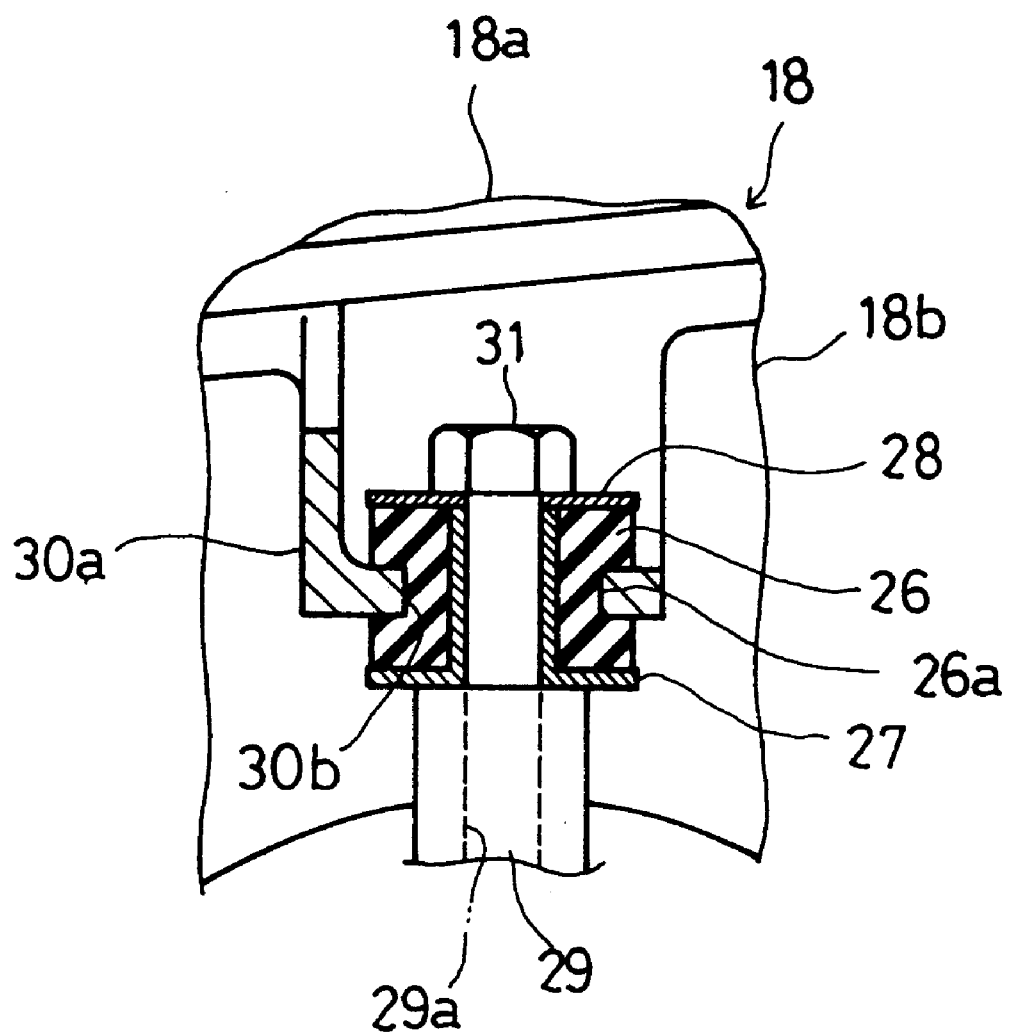
FIG. 7 is a view showing a structure for attaching the resonance vessel to a suction gathering pipe partly in section.

As shown in FIG. 1, at a downstream end of the suction gathering pipe 14 is erected a resonance vessel supporting stay 29. As shown in FIG. 7, the stay 29 has an end formed with a tapped hole 29a which a bolt 31 is screwed in.

As shown in FIG. 3, two sides 32b, 32c of the resonance vessel 18 each meeting at right angles with the side 32a have rear ends provided with second attachment arms 30a, 30a projecting outward. The arms 30a, 30a are formedwith bolt holes 30b, 30b, respectively.

The bolt hole 30b formed on the side 32b is aligned with the tapped hole 29a of the resonance vessel supporting stay 29 as shown in FIG. 7. A rubber member 26 is inserted between the holes 30b, 29a and tightened by the bolt 31 screwed into the tapped hole 29a to elastically support the rear end portion of the side 32b on the suction gathering pipe 14.

As shown in FIG. 3, the side 32b of the resonance vessel 18 is bent stepwise at a middle portion thereof to make a rear part of the resonance vessel 18 somewhat narrow.

The rubber member 26 inserted between the bolt hole 30b of the side 32b and the tapped hole 29a of the resonance vessel supporting stay 29 has the same construction as that of the rubber member 26 inserted between the bolt hole 23a of the side 32a and the inner bolt hole 26b. Therefore, a detailed description thereof is omitted.

Thus, the rear end portion of the side 32b of the resonance vessel 18 is elastically supported by the suction gathering pipe 14 through the rubber member 26 and the resonance vessel supporting stay 29. Therefore, when a vibration generated by operation of the engine 0 is transmitted to the above-mentioned rear end portion through the cylinder head 2, the suction manifold 11, the resonance vessel supporting stay 29 and the rubber member 26, the rubber member deforms elastically to absorb the vibration, so that transmission of the vibration to the resonance vessel 18 is intercepted or damped.

A rear end portion of the side 32c opposite to the side 32b is supported on an upstream end portion of the suction gathering pipe 14 with the throttle body fitted, by the same manner as the foregoing. Therefore a detailed description thereof is omitted. The resonance vessel 18 is divided into an upper half body 18a and a lower half body 18b. As shown in FIG. 8, the lower half body 18b is formed with a connecting pipe 34 penetrating a wall of the body 18b. The inner space 33 of the resonance vessel 18 communicates with the suction gathering chamber 15 within the suction gathering pipe 14 through an inner passage 36 of the connecting pipe 34. The gathering chamber 15 communicates with the independent suction passages 13, 13 . . . .

The inner space 33 of the resonance vessel 18 constitutes a resonance chamber which resonates with a suction air pressure wave generated when suction valves of respective cylinders of the engine o performs opening-closing motion and sends out a turned pressure wave. By suitably setting a volume of the resonance chamber (the inner space) 33, a length of the connecting pipe 34 (a length of a part 34a of the connecting pipe 34 projected into the resonance chamber 33) and a diameter of the connecting pipe 34, a resonance supercharging effect adapted to middle and high rotative sped regions of the engine 0 is exhibited and volumetric efficiency of suction can be improved. But the diameter of the inner passage 36 of the connecting pipe 34 cannot exceed the diameter of the suction gathering chamber 15.

In a low rotative speed region of the engine 0, length of the respective independent suction passages 13 functions effectively to exhibit inertia supercharging effect and improve volumetric efficiency of suction.

As shown in FIGS. 2 and 3, the connecting pipe 34 is positioned just downstream of the throttle body 16 directly facing above the suction gathering chamber 15. Namely, the connecting pipe 34 opens into the resonance chamber 33 at a corner part formed by the side 32c and the other side 32d opposite to the side 32a of the lower half body 18b.

An end portion 34a of the connecting pipe 34 is projected into the resonance vessel 18 and another end portion 34b of the pipe 34 is fitted through a seal rubber 37 in a cylindrical portion 14a extending from an opening formed at a top portion of the suction gathering pipe 14. The pipe end portion 34b is fitted to the cylindrical portion 14a so as not to project into the suction gathering chamber 15, therefore disturbance of suction air stream in the suction gathering chamber 15 is avoided. The seal rubber 37 is made of elastic rubber material and has a head section of large diameter and a cylindrical section. The cylindrical section has an outer peripheral surface formed with two annular convexes 37a and an inner peripheral surface formed with two annular concaves 37b corresponding to the convexes 37a.

When the seal rubber 37 is inserted between the pipe section 34b of the connecting pipe 34 and the cylindrical portion 14a of the suction gathering pipe 14, deformation of the annular convex 37a is absorbed by the annular concave 37b, so that surface pressure of the annular convex 37a against an inner peripheral surface of the cylindrical portion 14a can be raised to improve sealing nature in this section.

In the state that the surface pressure of the annular convex 37a is raised, the pipe section 34b of the connecting pipe 34 is fitted in the cylindrical portion 14a of the suction gathering pipe 14, therefore the resonance vessel 18 is supported elastically and firmly by the suction gathering pipe 14 also in this section, and transmission of vibration generated by operation of the engine 0 to the resonance vessel 18 is suppressed effectively.

Within the space A formed by the resonance vessel 18 extending above the independent suction pipes 12, 12 . . . of the suction manifold 11 between the cylinder head cover 3 and the suction gathering pipe 14, as shown in FIGS. 1 and 8, fuel injection valves 38, fuel supply pipes 39, pressure regulating valves 40 and the like for respective cylinders of the engine 0 are disposed on the independent suction pipes 12, 12 . . . in the vicinity of the cylinder head 2.

Thus, the resonance vessel 18 is disposed so as to extend between the cylinder head cover 3 and the suction gathering chamber 15 (suction gathering pipe 14) and covers above of the independent suction passages 13, 13 . . . (independent suction pipes 12, 12 . . . ) with the space A, and the space A has a volume capable of receiving the fuel injection valves 38, fuel supply pipes 39, the pressure regulating valves 40 and the like for respective cylinders of the engine 0.

As a result, the resonance vessel 18 does not protrude in a direction perpendicular to the row of cylinders and the space between the resonance vessel 18 and the independent suction passages 13, 13 . . . is utilized effectively, so that the suction apparatus 10 can be constructed compactly.

Since the resonance vessel 18 isolates heat in an upper part of the engine room from the fuel injection valves 38, the fuel supply pipes 39, and the suction manifold 11 including the independent suction passages 13, 13 . . . , lowering of engine out put and deterioration of engine starting nature can be prevented. Moreover, since the resonance vessel 18 hides the fuel injection valves 18, the fuel supply pipes 39 and the like, appearance of the engine 0 is improved. The resonance vessel 18 is supported by the cylinder head cover 3 and the suction gathering pipe (the suction gathering chamber) 14 elastically through the rubber members 26. As a result, vibration generated by operation of the engine 0 and transmitted to the resonance vessel 18 is intercepted or damped at the supporting section so as not to influence natural frequency of the resonance vessel 18, therefore, suction characteristic in resonance supercharging utilizing the resonance vessel 18 can be stabilized. And radiating sound from the resonance vessel 18 can be reduced.

By elastic support of the resonance vessel 18 on the cylinder head cover 3 and the suction gathering pipe 14 through the rubber members 26, a phase difference is caused between both vibrations of the resonance vessel 18 and the suction manifold 11, thereby both the vibrations can be suppressed by interference of the vibrations (dynamic damp effect). Therefore, durability of suction control parts such as the throttle body 16 connected to the suction manifold 11 or the like can be improved.

The resonance vessel 18 communicates with an upper part of the suction gathering chamber 15 at a position just downstream of the throttle body 16 which is fitted to an upper stream end of the suction gathering chamber 15.

Therefore, suction air pressure wave turned at the suction gathering section (suction gathering chamber 15, resonance chamber 33) including a resonance chamber 33 of the resonance vessel 18 does not oppose a suction air entering through the throttle body 16 and does not be influenced by the suction air.

Accordingly, damping of the suction air pressure wave in the suction gathering chamber 15 and the independent suction passages 13, 13 . . . is suppressed to the minimum and the pressure wave can influence another cylinder smoothly. Particularly, resonance supercharging effect of suction in middle and high rotative speed region of the engine 0 is improved to improve volumetric efficiency of suction.

Supposing that the resonance vessel 18 is connected to a downstream end wall of the suction gathering chamber 15, the suction air pressure wave turned at the suction gathering section including the resonance chamber 33 opposes a suction air stream entering through the throttle body 16 to be influenced by the suction air stream, therefore the effect as mentioned above cannot be exhibited.

Size of an opening of the resonance vessel 18 for communicating with the suction gathering chamber 15 (diameter of the inner passage 36 of the connecting pipe 34 and length of the pipe section 34a projecting into the resonance chamber 33) and volume of the resonance chamber 33 can be set suitably so that the maximum supercharging effect is obtainable in middle and high rotative speed region of the engine 0. And also from this aspect, volumetric efficiency of suction can be improved (see FIG. 11).

The resonance vessel 18 has the connecting pipe 34 integrally formed penetrating the wall of the lower half body 34a, an end section 34a of the connecting pipe 34 is projected in the resonance vessel 18, and another end section 34b is fitted in the cylindrical portion 14a extending from an opening portion formed on a top of the suction gathering pipe 14 through the seal rubber 37.

Therefore, the resonance vessel 18 is elastically supported by the suction gathering pipe 14 through the seal rubber 37 in addition to be supported by the cylinder head cover 3 and the suction gathering pipe 14 through the rubber members 26, so that vibration caused by operation of the engine 0 can be intercepted or damped also by the seal rubber 37. Accordingly, suction characteristic in resonance supercharging utilizing the resonance vessel 18 can be further stabilized and radiating sound from the resonance vessel 18 can be further reduced.

In addition, a connecting portion between the resonance vessel 18 and the suction gathering chamber 15 is sealed, and the connecting portion can be formed by a simple work that the pipe section 34b of the connecting pipe 34 is merely inserted in the cylindrical portion 14a of the suction gathering pipe 14 putting the seal rubber 37 between them.

In the above-mentioned embodiment, the resonance chamber 33 and the suction gathering chamber 15 are directly connected with each other through the inner passage 36 of the connecting pipe 34. However, as shown in FIG. 10 for example, a suction control valve 41 for opening or closing the inner passage 36 may be provided in the passage 36.

The suction control valve 41 is controlled so as to open and close by a diaphragm 42 and a not shown solenoid valve. The suction control valve 41 is closed in a low rotative speed region of the engine 0 (N<N1) to perform a suction utilizing inertia supercharging effect by the independent suction passages 13, 13 . . . , and opened in middle and high rotative speed region (N>N1) to perform a suction utilizing resonance supercharging effect by the resonance chamber 33. Thus, a high volumetric efficiency can be obtained as a whole (see FIG. 11).

Figure 11:
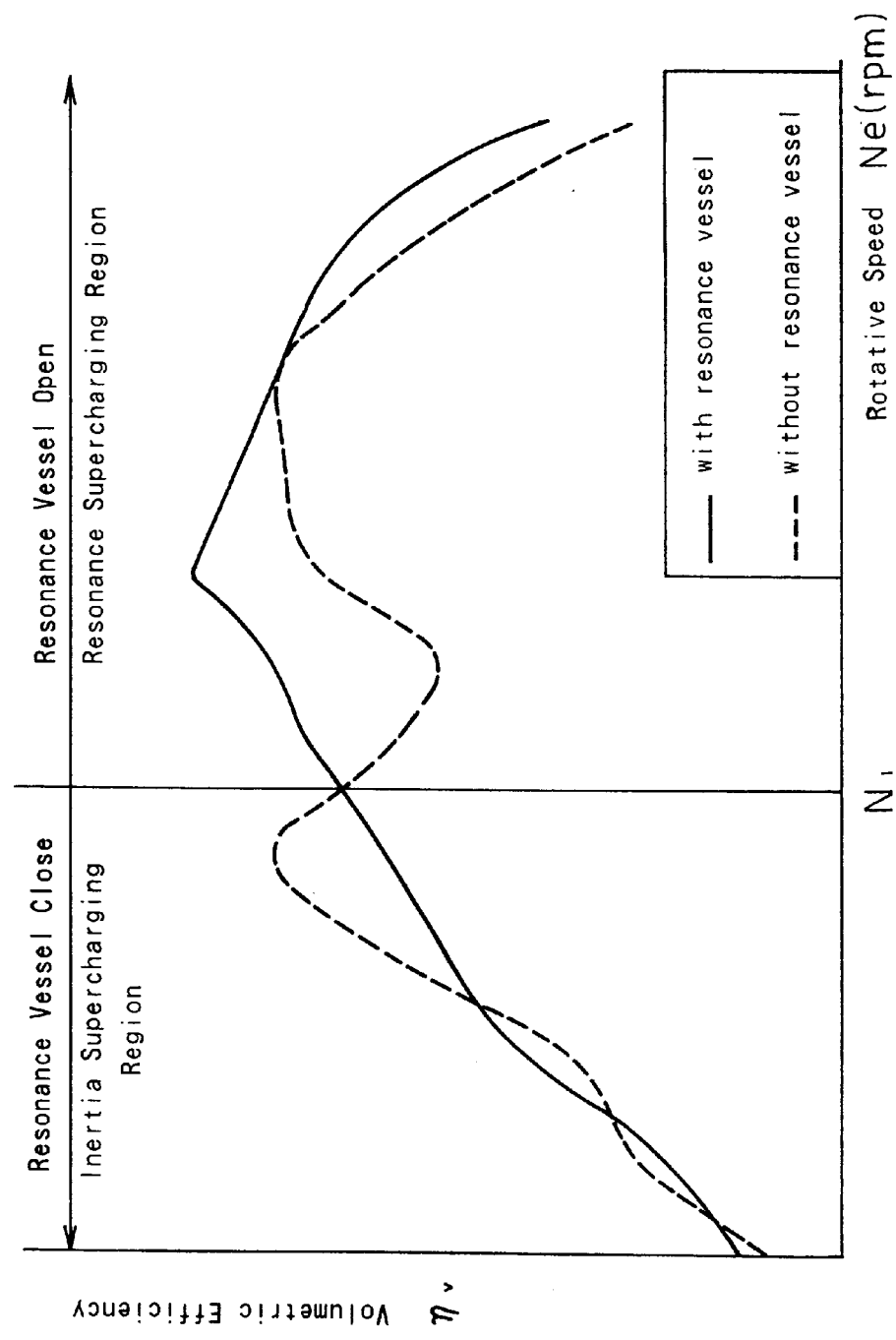
FIG. 11 is a graph showing characteristic of a multi-cylinder internal combustion engine having the suction apparatus of FIG. 10.

Namely, as shown in FIG. 11, in the low rotative speed region (N<N1) where the suction control valve 41 is closed to completely intercept communication of the resonance chamber 33 with the suction gathering chamber 15, suction characteristic obtainable by inertia supercharging effect due to passage length of the independent suction passages 13, 13 . . . is utilized, and in the middle and high rotative speed region (N>N1) where the suction control valve 41 is opened, suction characteristic obtainable by resonance supercharging effect due to suction air pressure wave turned at the suction gathering section including the resonance chamber 33 is utilized. Thus, two suction characteristics (inertia supercharging and resonance supercharging) are utilized maximally efficiently and a high volumetric efficiency of suction is obtained in all rotative speed regions.

As for the suction control valve 41, an opening-closing valve of butterfly type or rotary type can be used. The diaphragm 42 and the solenoid valve for controlling the suction control valve 41 can be disposed in the space A under the resonance vessel 18. Accordingly, appearance of the engine is not injured, parts related to the suction apparatus 10 can be disposed intensively within the space A, and assembling work is easy.

In place of the suction control valve 41, a passage length variable means for lengthening and shortening the connecting passage may be provided. In this case, if the projecting length of the connecting passage in the suction gathering chamber is increased, suction air stream in the suction gathering chamber 15 is disturbed, therefore it is not desirable.

In case that the passage length variable means is provided and it is intended to improve volumetric efficiency by resonance supercharging effect in a middle rotative speed region of the engine 0, the connecting passage length is increased or reduced according to Helmholtz's equation. The same effect can be obtained by increasing volume of the resonance chamber 33, too. In order to improve volumetric efficiency by resonance supercharging effect in a high rotative speed region of the engine 0, a measure contrary to the above can be taken.

Next, another embodiment of the present invention will be described with reference to FIGS. 12 to 15 in which various parts are suffixed with the same symbols as corresponding parts in the above-mentioned embodiment.

Figure 12:
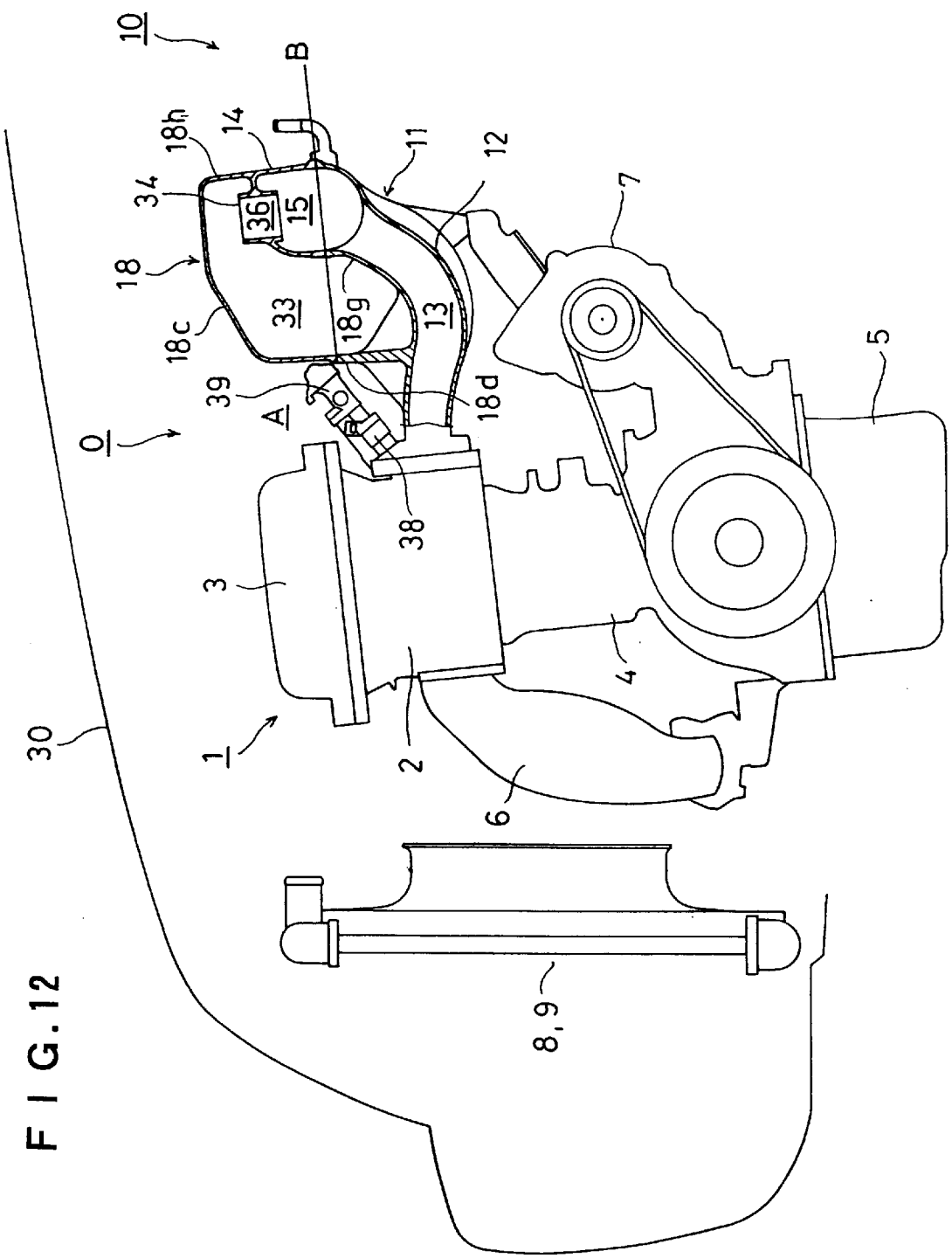
FIG. 12 is a side view similar to FIG. 1 showing the other embodiment of the present invention.

In this embodiment, as shown in FIG. 12, the resonance vessel 18 has an arcuate bottom wall 18g, a vertical rear wall 18h, a vertical front wall 18d and a bent top wall 18c.

A front part of the top wall 18c is inclined downward toward the front so that a front edge of the wall 18c is positioned at the same height as an upper wall of the cylinder head cover 3 leaving a space A between them. Therefore, a hot air passing through the radiator 8 and the condenser 9 from front of the engine room flows along an upper wall surface of the cylinder head cover 3 and then along an outer surface of the top wall 18c of the resonance vessel 18 smoothly.

Since the hot air flows away along the upper surfaces of the cylinder head cover 3 and the resonance vessel 18, fuel control parts such as fuel injection valves 38, fuel supply pipes (deliver pipes) 39 and pressure regulating valves disposed in the space A is shielded from the hot air, and lowering of engine out put and deterioration of engine starting nature are prevented.

The resonance chamber 33 formed within the resonance vessel 18 communicates with an upper part of the suction gathering chamber 15 at a position just downstream of the throttle body 16 through the connecting passage 36 formed within the connecting pipe 34. The position corresponds to a corner portion of the resonance vessel 18 formed by a right side 18e and a rear side 18f (FIG. 13). The connecting pipe 34 is integrally formed at an upper wall of an end portion of the suction gathering pipe 14 penetrating the upper wall.

Figure 14:
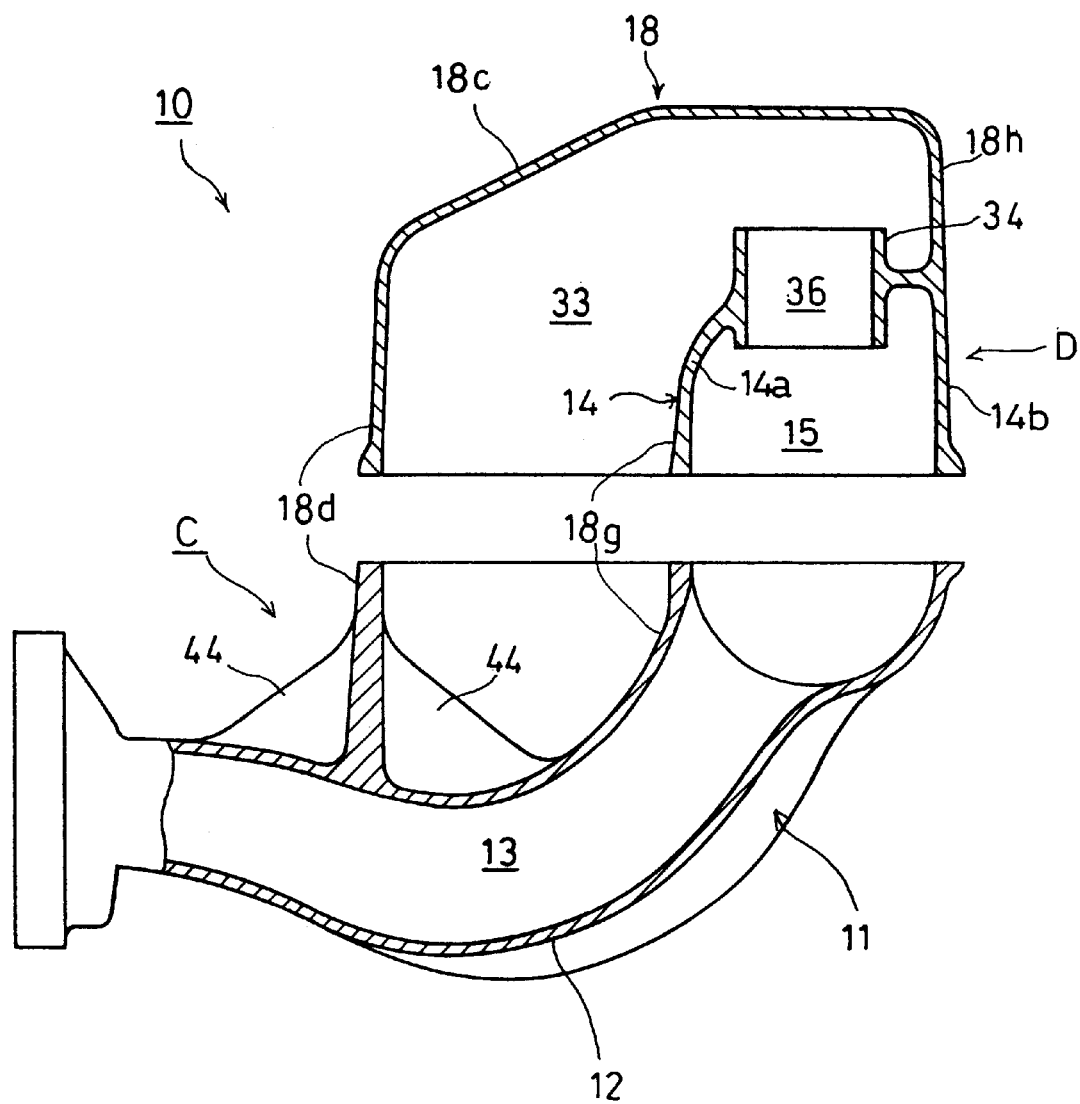
FIG. 14 is an exploded view of a suction manifold and a resonance vessel in the suction apparatus of FIG. 12.

As shown in FIGS. 12 and 14, the suction manifold 11 and the resonance chamber 33 (resonance vessel 18) are formed by combining a cast lower half body C including the independent suction passages 13, 13 . . . , a lower half of the suction gathering chamber 15 and a lower half of the resonance chamber 33, and a cast half body D including an upper half of the suction gathering chamber 15 and an upper half of the resonance chamber 33.

As shown in FIG. 14, a wall forming an upper half of the suction gathering chamber 15 consists of an arcuate wall portion 14a having a section of a quarter circle and a vertical wall portion 14b, and the connecting pipe 34 is formed integrally with the arcuate wall portion 14a. The vertical wall portion 14b is connected to the vertical wall 18h of the resonance vessel 18 continuously.

Connecting portions of the vertical wall 18d of the resonance chamber 33 with the respective independent suction pipes 12, 12 . . . are integrally formed with ribs 44 to improve rigidity of the resonance vessel 18.

Figure 15:
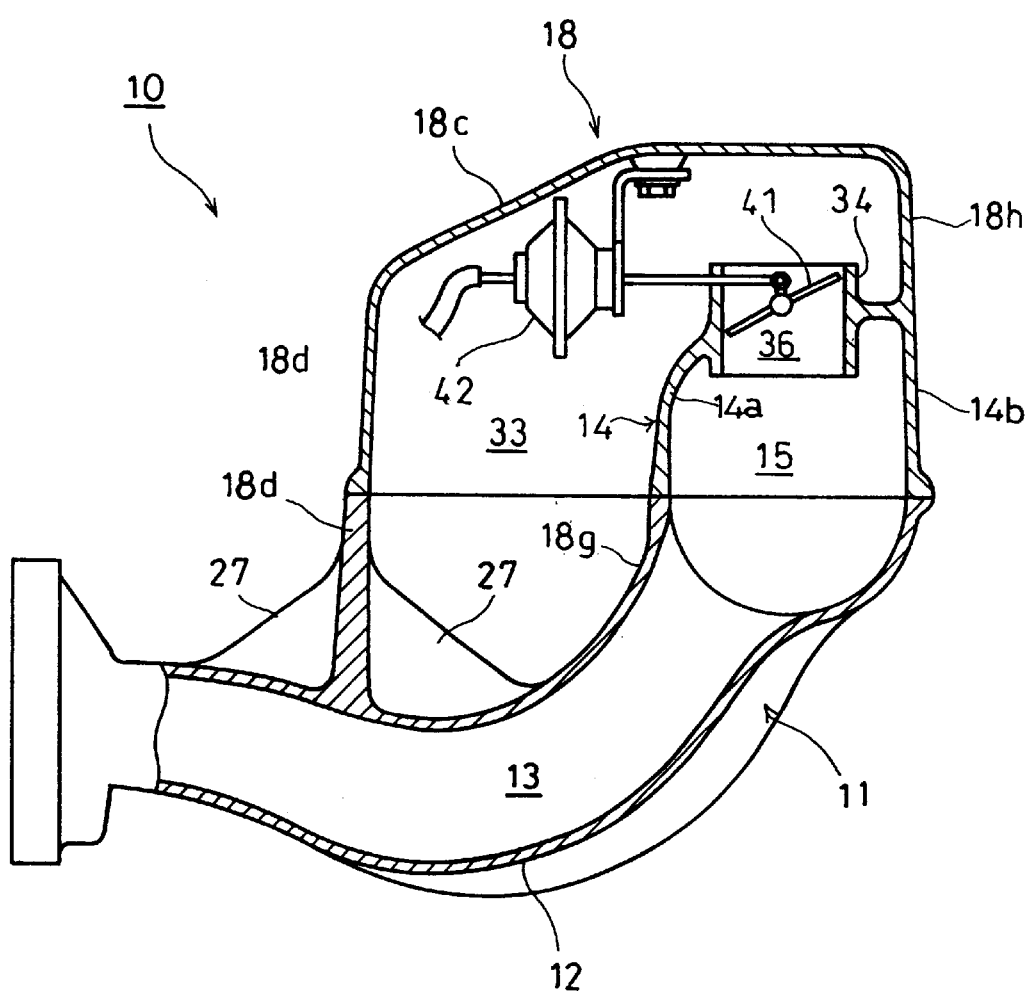
FIG. 15 is a sectional side view of a suction apparatus according to further embodiment of the present invention.

FIG. 15 shows a modification of the suction apparatus shown in FIGS. 12 to 14, in which a suction control valve 41 for opening and closing the connecting passage 36 is provided in the connecting pipe 34.

A diaphragm 42 and a solenoid valve for driving the suction control valve 41 and a vacuum tank for feeding a vacuum to the diaphragm 42 is disposed within the suction chamber 33, so that a good appearance can be obtained and assembling work is easy. The vacuum tank may be formed integrally with the above-mentioned upper half body D or D.

In place of the suction control valve 41, a passage length variable means for lengthening and shortening the connecting passage may be provided. In this case, the passage length is lengthened by increasing the projecting length of the connecting passage in the resonance chamber 33. If the projecting length in the suction gathering chamber is increased, suction air stream in the suction gathering chamber 15 is disturbed undesirably.

An upper portion of the resonance vessel 18 may overhang a front part (downstream part) of the independent suction passages 13, 13 . . . so as to cover the fuel control parts such as the fuel injection valves and the fuel supply pipes from above.

The embodiment of FIGS. 12 to 15 exhibits the same effects as those described above with regard to the embodiment of FIGS. 1 to 11.

What is claimed is:

1. A suction apparatus of a multi-cylinder internal combustion engine having a suction manifold disposed in a direction parallel with a row of cylinders at one side of a cylinder head which includes a plurality of independent suction passages of equal length each extending from an engine main body at right angle, a suction gathering chamber connected to said suction passages and disposed in the direction parallel with the row of cylinders, a throttle body provided at an upper stream end of said suction gathering chamber, and a resonance vessel communicating with said suction gathering chamber, wherein said resonance vessel is supported by a cylinder head cover and a wall of said suction gathering chamber elastically through rubber members covering above of said independent suction passages with a space, and communicates with an upper part of said suction gathering chamber at a just downstream position of said throttle body, said space having a volume capable of receiving at least fuel injection valves and fuel supply pipes for respective cylinders of said internal combustion engine.

2. A suction apparatus of a multi-cylinder internal combustion engine as claimed in claim 1, wherein said resonance vessel has first attachment arms projected at both end portions of a first side, said attachment arms being elastically supported by attachment pedestals formed on said cylinder head cover through a bracket.

3. A suction apparatus of a multi-cylinder internal combustion engine as claimed in claim 2, wherein said resonance vessel has second attachment arms formed on respective second sides meeting at right angles with said first side projected outward at end portions of said second sides opposite to said first side, said second attachment arms being elastically supported by said suction gathering chamber.

4. A suction apparatus of a multi-cylinder internal combustion engine as claimed in claim 3, wherein each of said first and second attachment arms has a bolt hole in which a cylindrical rubber member having an axial bolt insertion hole is inserted.

5. A suction apparatus of a multi-cylinder internal combustion engine as claimed in claim 1, wherein said resonance vessel has a connecting pipe formed integrally penetrating a bottom wall of said vessel, one end of said connecting pipe is projected into said resonance vessel and another end of said connecting pipe is elastically supported through a seal rubber by a pipe-like section integrally extending from an opening formed in an upper wall of said suction gathering chamber.

6. A suction apparatus of a multi-cylinder internal combustion engine as claimed in claim 5, wherein said seal rubber has a head section of large diameter and a cylindrical section, circular convexes are formed on an outer peripheral surface of said cylindrical section, and circular concaves are formed on an inner peripheral surface of said cylinder section corresponding to said circular convexes.

7. A suction apparatus of a multi-cylinder internal combustion engine as claimed in claim 6 wherein said another end of said connecting pipe is fitted in said pipe-like section of said suction gathering chamber with said seal rubber inserted between them, thereby said head section of said seal rubber comes into contact with a bottom of said resonance vessel to support it.

8. A suction apparatus of a multi-cylinder internal combustion engine as claimed in claim 5, wherein a suction control valve is provided in an inner passage of said connecting pipe so as to open in middle and high engine rotative speed regions and close in a low engine rotative speed region.

9. A suction apparatus of a multi-cylinder internal combustion engine as claimed in claim 8, wherein a diaphragm and a solenoid valve for driving said suction control valve are disposed in said space under said resonance vessel.

10. A suction apparatus of a multi-cylinder internal combustion engine as claimed in claim 5, wherein passage length of said connecting pipe projected into said resonance vessel can be expanded and contracted, and passage length changing means for shortening said passage length in a high engine rotative speed region and lengthening said passage length in a middle engine rotative speed region is provided.

* * * * *